(12) United States Patent
Hollmann

(10) Patent No.: US 9,193,071 B2
(45) Date of Patent: Nov. 24, 2015

(54) CONTROL OF A ROBOT

(75) Inventor: Stefan Hollmann, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 87 days.

(21) Appl. No.: 13/877,836

(22) PCT Filed: Sep. 27, 2011

(86) PCT No.: PCT/EP2011/004832
§ 371 (c)(1),
(2), (4) Date: Apr. 4, 2013

(87) PCT Pub. No.: WO2012/045403
PCT Pub. Date: Apr. 12, 2012

(65) Prior Publication Data
US 2013/0218334 A1 Aug. 22, 2013

(30) Foreign Application Priority Data
Oct. 6, 2010 (DE) .......................... 10 2010 047 641

(51) Int. Cl.
*G06F 19/00* (2011.01)
*B25J 9/16* (2006.01)

(52) U.S. Cl.
CPC ..... *B25J 9/1674* (2013.01); *G05B 2219/40202* (2013.01); *Y10S 901/49* (2013.01)

(58) Field of Classification Search
CPC .............. B25J 9/1674; G05B 2219/40202; Y10S 901/49
USPC .................................. 700/245, 248, 250, 252
See application file for complete search history.

(56) References Cited

U.S. PATENT DOCUMENTS

| 5,497,061 | A | | 3/1996 | Nonaka et al. |
| 5,760,560 | A | * | 6/1998 | Ohya et al. ................. 318/568.1 |
| 5,937,143 | A | * | 8/1999 | Watanabe et al. ............. 700/264 |
| 5,949,683 | A | * | 9/1999 | Akami et al. ................. 700/123 |
| 6,218,802 | B1 | * | 4/2001 | Onoue et al. .............. 318/568.13 |
| 7,245,990 | B2 | * | 7/2007 | Watanabe et al. ............. 700/264 |
| 8,054,027 | B2 | * | 11/2011 | Nihei et al. .............. 318/568.11 |

(Continued)

FOREIGN PATENT DOCUMENTS

| CN | 1848012 A | 10/2006 |
| CN | 101402202 A | 4/2009 |

(Continued)

OTHER PUBLICATIONS

European Patent Office; Search Report in International Patent Application No. PCT/EP2011/004832 dated Dec. 12, 2011; 5 pages.

(Continued)

*Primary Examiner* — Ian Jen
(74) *Attorney, Agent, or Firm* — Wood, Herron & Evans, LLP

(57) ABSTRACT

In addition to an automatic operating mode ("AUTOMATIC"), in which protective monitoring (1) is carried out, and a set-up operating mode ("SET-UP"), in which manual control input (3, 6) is provided, a method according to the invention for controlling a robot comprises a remote access operating mode ("REMOTE ACCESS") in which the protective monitoring (1) is carried out and manual control input (3, 5, 7) is provided.

14 Claims, 1 Drawing Sheet

(56) References Cited

U.S. PATENT DOCUMENTS

| | | | |
|---|---|---|---|
| 2003/0040840 A1* | 2/2003 | Hirayama et al. | 700/245 |
| 2004/0138779 A1* | 7/2004 | Shibata et al. | 700/245 |
| 2004/0249508 A1* | 12/2004 | Suita et al. | 700/245 |
| 2006/0108960 A1* | 5/2006 | Tanaka et al. | 318/568.21 |
| 2006/0178775 A1* | 8/2006 | Zhang et al. | 700/245 |
| 2006/0178778 A1* | 8/2006 | Fuhlbrigge et al. | 700/264 |
| 2006/0192515 A1* | 8/2006 | Takayama et al. | 318/568.21 |
| 2006/0279245 A1* | 12/2006 | Hashimoto et al. | 318/568.12 |
| 2008/0021597 A1* | 1/2008 | Merte et al. | 700/255 |
| 2009/0289791 A1* | 11/2009 | Onishi | 340/555 |
| 2010/0191372 A1* | 7/2010 | Nihei et al. | 700/245 |
| 2010/0305758 A1* | 12/2010 | Nishi et al. | 700/264 |
| 2011/0052366 A1* | 3/2011 | Bonin et al. | 414/800 |
| 2011/0282490 A1* | 11/2011 | Weigele et al. | 700/250 |

FOREIGN PATENT DOCUMENTS

| | | |
|---|---|---|
| DE | 19718284 A1 | 12/1998 |
| JP | 2001088071 A | 4/2001 |
| WO | 2010/060574 A1 | 6/2010 |
| WO | 2010/063349 A1 | 6/2010 |

OTHER PUBLICATIONS

German Patent Office; Search Report in German Patent Application No. 10 2010 047 641.2 dated Jul. 6, 2011; 8 pages.

Chinese Patent Office; Office Action in Chinese Patent Application No. 201180022893.4 dated May 28, 2014; 17 pages.

* cited by examiner

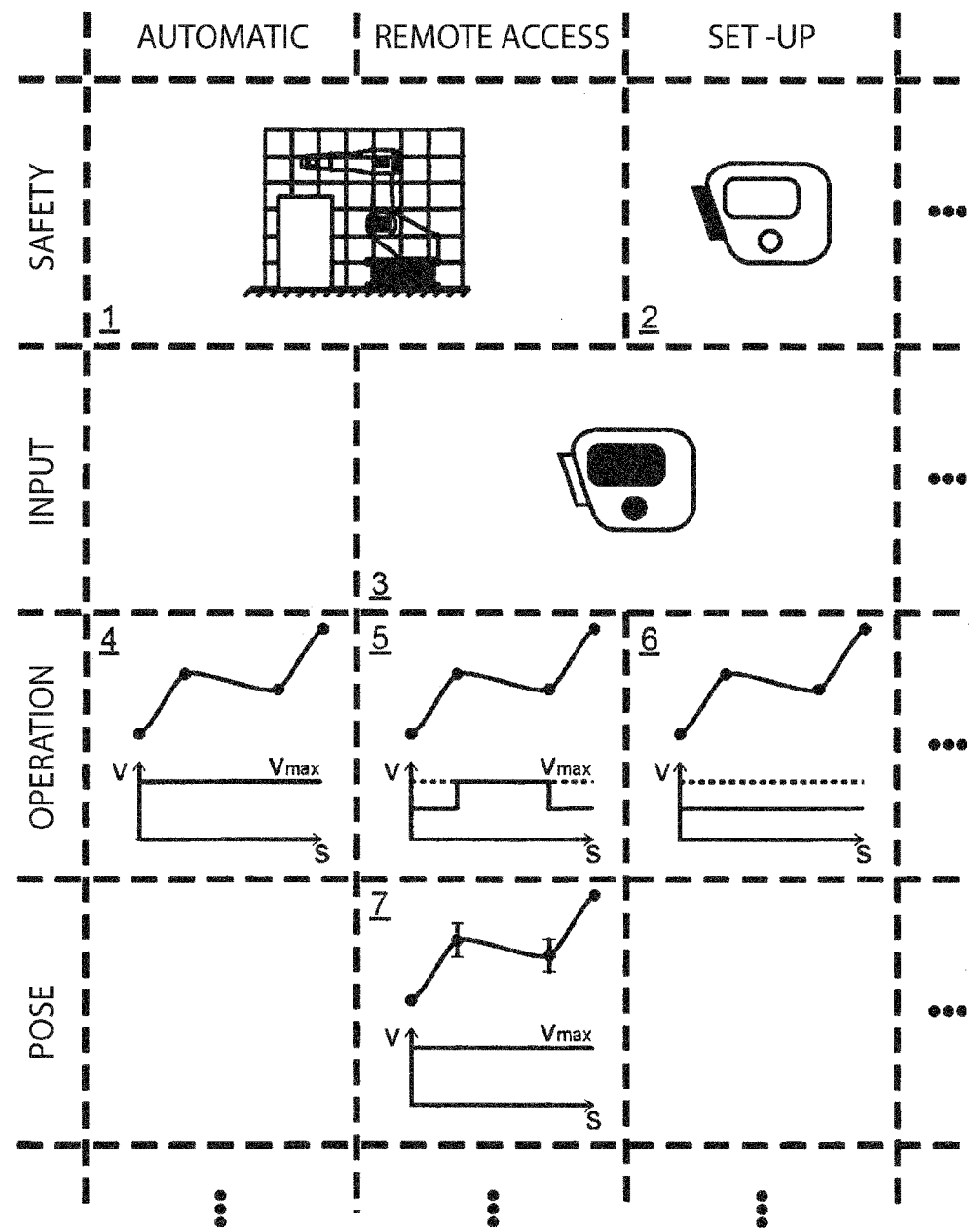

CONTROL OF A ROBOT

TECHNICAL FIELD

The present invention concerns a process and a device to control a robot, specifically an industrial robot, where protective monitoring is carried out in an automatic operating mode and manual control input is provided in a set-up operating mode.

BACKGROUND

For example, DE 197 18 284 C2 publishes how to toggle between operating a robot in an automatic operating mode and in a set-up operating mode.

In this automatic operating mode, the operation of the robot is feasible only while a protective device, such as a protective cover, is closed the robot can then operate a specified task program automatically at full operating speed, because there is assurance that no person is located in the working range of the robot that could be endangered by the same, such as by inattention or a faulty function.

In the set-up operating mode, which is specifically intended to teach the robot how to pose, the robot may be operated manually even though the protective cover is open in order to provide the user with a better view of the working range during the teaching activity, for example. In order to assure safety nonetheless, a confirming device is provided, which the user must operate actively, such as at least one confirming key. The operation of the robot in the set-up operating mode requires that the confirming key is operated the robot may then be operated manually at a reduced speed.

The present invention has the objective to provide a further improvement in the control of a robot by a user.

SUMMARY

The invention teaches at least one additional operating mode apart from the automatic operating mode with protective monitoring and a set-up operating mode with manual control, where the additional operating mode combines functions of the two modes, namely the automatic operating mode and the set-up operating mode, in an advantageous manner.

It is preferable that this remote access operating mode relies on the same protective monitoring as the automatic operating mode. This may encompass specifically the surveillance of the working space of the robot. A preferred embodiment monitors one or more separating protective devices, such as protective switches, that assure that doors leading to the working space of the robot and that may be incorporated in a protective fence are locked, for example. In addition or alternatively, it is also possible to use non-contact protective devices, such as light barriers, light curtains or the like. A preferred embodiment uses at least one non-separating protective device based on optical, electromagnetic, force balance measurement and/or thermal monitoring of the working space, where entry into the working space by a person is sensed by heat measurement, weight on the floor or a parameter change. For example, the preferred optical monitoring of the working space may rely on the optical comparison of images of the working space with object identification, such as by the superimposition of various images.

It is advantageous that protective monitoring in the remote access operating mode may eliminate the need for confirming devices. Thus, it is feasible to simplify control devices or programming tools. Specifically, it is feasible to use a control device, preferably a hand-held control device, without a confirming device.

It is preferable that the remote access operating mode uses at least in part one or more manual control inputs in the same manner as used in the set-up operating mode. It is possible here that all or merely a few of the control inputs or functions of the set-up operating mode are also used in the remote access operating mode. Similarly, the remote access operating mode may include additional functions beyond the functions used in the set-up operating mode. This could respond to the different safety considerations between the remote access operating mode that assures safety in manual control inputs by protective monitoring and the set-up operating mode that allows operation of the robot only when the confirming device is engaged.

A preferred embodiment limits the manual operation of the robot in the remote access operating mode in the same manner as in the set-up operating mode. Specifically, regardless of the protective monitoring, the manual operation may be limited in speed and/or acceleration of a TCP and/or joint(s) of the robot that is less than the maximum speed or acceleration feasible given the dynamics of the robot, for example.

In addition or alternatively, it is preferable that the operation of the robot under program control may be limited in the remote access operating mode in the same manner as in the set-up operating mode. For example, it may thus be specified that the robot can travel along programmed routes only at reduced speeds regardless of the protective monitoring. It is feasible in this way to test specifically modified routes that have not yet been travelled or tested at low risk and to make corrections, if needed.

A preferred embodiment provides for limits on the operation of the robot in the remote access operating mode by selection and/or by segments. Specifically, the limit may be imposed for certain segments of an operating program or of a programmed route. Such segments could then be travelled initially at a reduced speed and thus be tested. Tested segments could then be certified for full processing speed. For example, this approach could would facilitate the sequential test and modification, if needed, of segments of a circuitous route, where segments that had been tested previously could be travelled at full processing speed, i.e. that the speed limit is vacated for these segments.

A preferred embodiment provides for manual adjustments of one or more pre-specified poses of the robot, specifically taught or offline programmed poses, in the remote access operating mode. Given the protective monitoring used in the remote access operating mode of the invention, a preferred embodiment permits this also during the execution of operating programs at full operating speed. Full operating speed is defined here with the normal definition, specifically the speed with which the robot follows the operating program in the automatic operating mode, specifically on a pre-specified course.

Preferably, the manual adjustment of one or more poses will be permitted only within a pre-specified range that may be expressed as a collar around the trajectory of the robot in its physical location, as a sphere around taught TCP positions and/or as maximum deviations from various joint coordinates.

A preferred embodiment permits modifications, specifically edits, in the operating program of the robot in the remote access operating mode. Preferably, this would be handled in the same manner as in the set-up operating mode. Specifically, an operating program that was modified in the remote access operating mode can be tagged automatically. In addition or alternatively, an automatic tagging could be done when an operating program is tested, specifically in operation, such as when a course was run.

A preferred embodiment permits modifications of the control of the robot in the remote access operating mode. Specifically, a configuration and/or parameters could be modified, such as kinematics, parameters on inertia and/or rigidity of the robot and/or operating loads, contact parameters that describe a contact between the robot and the environment, such as friction values, rigidity of surrounding materials or boundary conditions and the like.

It is preferable that one or more signal inputs or signal outputs of a control component can be modified manually in the remote access operating mode. For example, outputs of sensors or the like could be set manually in order to simulate various boundary conditions of the environment in the remote access operating mode, such as the presence of work pieces or the like.

BRIEF DESCRIPTION OF THE DRAWINGS

Other advantages and characteristics derive from the subsidiary claims and the embodiment examples. In this regard, the only FIGURE shows in partly schematic form:

FIG. 1: various operating modes of a robot control in an embodiment of the invention.

DETAILED DESCRIPTION

FIG. 1 presents a table showing various functions in various operating modes of a robot control in an embodiment of the present invention. As indicated by dots, additional operating modes (shown in additional columns) and/or additional functions (shown in additional rows) may be included. Symbols centered between two columns indicate that the same or a similar function is included in both operating modes.

The basic automatic operating mode "AUTOMATIC" (left column of FIG. 1) includes protective monitoring (first row "SAFETY" of FIG. 1). This is shown symbolically by a protective fence around the working space of an industrial robot with a protective cover, the lock of which cover is monitored by a protective switch. If the protective switch and thus the protective cover are closed, the robot may travel a course at full operating speed $v=v_{max}$ where the course is shown by four taught TCP positions as indicated by points in FIG. 1 (third row "OPERATION" of FIG. 1).

The likewise essentially known set-up operating mode "SET-UP" (right column of FIG. 1) monitors in lieu of protective monitoring whether a confirming key of a hand operating device is pushed. If the confirming key is pushed, as indicated in FIG. 1 by a solid key of the hand operating device, shown here schematically, then the robot can be moved manually at reduced speed $v<v_{max}$ (third row "OPERATION" of FIG. 1).

The middle column "REMOTE ACCESS" depicts a remote access operating mode according to the invention. It shows the protective monitoring previously described with reference to the automatic operating mode (first row "SAFETY" of FIG. 1), inasmuch as the lock of the protective cover is monitored. However, the confirming key is not monitored.

As long as the protective cover is closed, the robot can be moved manually at reduced speed in the remote access operating mode, as described above in reference to the set-up operating mode. It may also be moved by the control program on the taught course of the robot at reduced speed. Once a segment has been traversed and thus confirmed, it may be marked as approved. This segment may then be traversed at full operating speed, as depicted schematically in the third row "OPERATION" of FIG. 1.

In addition, the remote access operating mode has the same option as the set-up operating mode with regard to the editing of an operating program and/or the configuration and/or the parameters of the robot, as is indicated in the second row "INPUT" of FIG. 1 by solid operating elements of the hand operating device.

In particular, as is shown in the fourth row "POSE" of FIG. 1, the remote access operating mode permits the modification of taught points representing poses of the robot within prespecified ranges shown schematically in FIG. 1 even during automatic execution of the operating program at full operating speed, given that the protective monitoring (first row of FIG. 1) precludes any danger to persons.

What is claimed is:

1. A method of controlling a robot having an automatic operating mode, a set-up operating mode, and a remote access operating mode, the method comprising:
    carrying out protective monitoring of the robot when the robot is in the automatic operating mode;
    enabling manual control input when the robot is in the set-up operating mode; and
    carrying out the protective monitoring when the robot is in the remote access operating mode while also enabling the manual control input.

2. The method of claim 1, further comprising limiting operations in the remote access operating mode to manual and/or program-controlled operations of the robot.

3. The method of claim 2, further comprising limiting operations in the remote access operating mode to the operation of the robot in selected and/or sequential segments.

4. The method of claim 1, further comprising manually modifying a pose of the robot in the remote access operating mode.

5. The method of claim 1, further comprising modifying at least one of an operating program or the control of the robot in the remote access operating mode.

6. The method of claim 1, further comprising manually modifying the signal output of a control component in the remote access operating mode.

7. The method of claim 1, further comprising:
    including at least one function of the set-up operating mode in the remote access operating mode.

8. The method of claim 1, wherein carrying out the protective monitoring includes monitoring of the working space of the robot.

9. The method of claim 1, further comprising operating the robot independently of a confirming device in the remote access operating mode.

10. A control device for a robot with an input device to select an operating mode, the control device comprising a storage medium including program code that, when executed by the control device, causes the control device to:
    perform protective monitoring of the robot in an automatic operating mode;
    enable manual control input in a set-up operating mode; and
    perform the protective monitoring in a remote access operating mode while also enabling the manual control input.

11. A computer programming product with a program code stored on a non-transitory machine readable data medium, the programming code configured to, when executed by a computer, cause the computer to:
    perform protective monitoring of the robot in an automatic operating mode;

enable manual control input in a set-up operating mode; and perform the protective monitoring in a remote access operating mode while also enabling the manual control input.

12. The method of claim 2, wherein limiting operations comprises limiting the speed of manual and/or program-controlled operations.

13. The method of claim 4, wherein manually modifying the pose comprises modifying the pose within a pre-specified range.

14. The method of claim 8, wherein monitoring the working space of the robot comprises monitoring at least one of separating protective device or non-separating protective device.

* * * * *